(12) United States Patent
Liu

(10) Patent No.: US 10,503,884 B2
(45) Date of Patent: Dec. 10, 2019

(54) PERMISSION CONTROL SYSTEM AND METHOD, COMPUTER MOUSE AND COMPUTER SYSTEM

(71) Applicant: BOE Technology Group Co., Ltd., Beijing (CN)

(72) Inventor: Kairan Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 94 days.

(21) Appl. No.: 15/531,980

(22) PCT Filed: Oct. 18, 2016

(86) PCT No.: PCT/CN2016/102341
§ 371 (c)(1),
(2) Date: May 31, 2017

(87) PCT Pub. No.: WO2017/067431
PCT Pub. Date: Apr. 27, 2017

(65) Prior Publication Data
US 2017/0329947 A1 Nov. 16, 2017

(30) Foreign Application Priority Data
Oct. 23, 2015 (CN) .......................... 2015 1 0696425

(51) Int. Cl.
*G06F 21/32* (2013.01)
*G06F 21/45* (2013.01)
*G06F 21/62* (2013.01)

(52) U.S. Cl.
CPC .............. *G06F 21/32* (2013.01); *G06F 21/45* (2013.01); *G06F 21/6218* (2013.01)

(58) Field of Classification Search
CPC .......... G06F 21/32; G06F 21/31; G06F 21/45; G06F 21/6218; H04L 63/08; H04L 63/10; H04L 63/06802–06809
See application file for complete search history.

(56) References Cited

U.S. PATENT DOCUMENTS 8,023,700 B2 * 9/2011 Riionheimo ........ G06F 3/04883
340/5.53
2005/0057339 A1 * 3/2005 Ikehara ............... G06F 3/03543
340/5.52
(Continued)

FOREIGN PATENT DOCUMENTS

CN 101461219 A 6/2009
CN 101689096 A 3/2010
(Continued)

OTHER PUBLICATIONS

Jan. 22, 2017—(WO) International Search Report and Written Opinion Appn PCT/CN2016/102341 with English Tran.
(Continued)

*Primary Examiner* — Khalil Naghdali
*Assistant Examiner* — Shaqueal D Wade
(74) *Attorney, Agent, or Firm* — Banner & Witcoff, Ltd.

(57) ABSTRACT

A permission control system includes: fingerprint modules, each of the fingerprint modules includes: a fingerprint acquisition unit configured to acquire a fingerprint of a finger; and a processing unit configured to determine whether the fingerprint that is acquired is in consistence with default fingerprints; and the system further includes: a control module configured to enable a corresponding operation permission according to a number of fingerprint or fingerprints in consistence with the default fingerprints. The system can flexibly enable a plurality of different operation
(Continued)

permissions and hence can improve the flexibility and the convenience of permission control.

19 Claims, 2 Drawing Sheets

(56) References Cited

U.S. PATENT DOCUMENTS

| | | | | |
|---|---|---|---|---|
| 2007/0057763 A1* | 3/2007 | Blattner | ............. | G06F 3/03543 340/5.52 |
| 2011/0153497 A1* | 6/2011 | Determan | ............... | G06F 21/32 705/44 |
| 2011/0300829 A1* | 12/2011 | Nurmi | ................... | G06F 1/1616 455/411 |
| 2015/0277652 A1* | 10/2015 | Kim | ........................ | H04M 1/67 345/173 |

FOREIGN PATENT DOCUMENTS

| | | |
|---|---|---|
| CN | 203930719 U | 11/2014 |
| CN | 105389502 A | 3/2016 |

OTHER PUBLICATIONS

Jun. 7, 2017—(CN) First Office Action Appn 201510696425.5 with English Tran.

\* cited by examiner

PERMISSION CONTROL SYSTEM AND METHOD, COMPUTER MOUSE AND COMPUTER SYSTEM

The application is a U.S. National Phase Entry of International Application No. PCT/CN2016/102341 filed on Oct. 18, 2016, designating the United States of America and claiming priority to Chinese Patent Application No. 201510696425.5, filed Oct. 23, 2015. The present application claims priority to and the benefit of the above-identified applications and the above-identified applications are incorporated by reference herein in their entirety.

TECHNICAL FIELD

Embodiments of the present disclosure relate to a permission control system, a mouse, a computer system and a permission control method.

BACKGROUND

The computer in the state of art usually requires the user to enter a password for user authentication, but the password can easily be cracked or faked, which often results in the leakage of personal privacy and important documents of the user in the computer.

Moreover, permissions are assigned by verifying user ID. As one user has one ID only, only one kind of permissions can be assigned, so the flexibility of permission assignment can be limitative.

SUMMARY

At least embodiment of the present disclosure provides a permission control system, comprising: fingerprint modules, wherein each of the fingerprint modules comprises: a fingerprint acquisition unit configured to acquire a fingerprint of a finger; and a processing unit configured to determine whether the fingerprint that is acquired is in consistence with default fingerprints; and the system further comprises: a control module configured to enable a corresponding operation permission according to a number of fingerprint or fingerprints in consistence with the default fingerprints.

For example, the number of the fingerprint modules is at least two; and different fingerprint modules correspond to different permission levels.

For example, in a case where only one fingerprint is in consistence with one of the default fingerprints, the control module enables a corresponding operation permission according to a permission level corresponding to the fingerprint module which acquires the fingerprint; and in a case where at least two fingerprints are in consistence with the default fingerprints, the control module enables a corresponding operation permission according to the number of fingerprints in consistence with the default fingerprints.

For example, the control module is configured to calculate a sum of the number of fingerprints in consistence with the default fingerprints in the fingerprint modules, and enable the corresponding operation permission, in which the number of fingerprint in consistence with the default fingerprints in each fingerprint module is zero or one.

For example, each of the fingerprint modules further comprises: a touch sensor, wherein in a case where a fingerprint recognized by the fingerprint module is in consistence with the default fingerprints, the control module entirely or partially enables a touch function of the touch sensor of the fingerprint module.

For example, the control module generates and outputs a corresponding operation instruction according to a touch signal sensed by the touch sensor upon the touch function of the touch sensor being enabled.

For example, the system further comprises: an alarm module configured to generate an alarm instruction and/or an alarm message in a case where no acquired fingerprint is in consistence with the default fingerprints within a first time limit or a default recognition attempt limit.

At least embodiment of the present disclosure provides a mouse, comprising the permission control system, and further comprising: a mouse body comprising a left side, a right side, a left button area and a right button area, wherein each fingerprint module also comprises an input area correspondingly; and the input area is disposed on at least one of the left side, the right side, the left button area or the right button area.

For example, a number of the fingerprint modules is four; and correspondingly four input areas are respectively disposed on the left side, the right side, the left button area and the right button area of the mouse body.

For example, each of the fingerprint modules further comprises: a pressure sensor configured to detect pressure; and in a case where no pressure is detected by all pressure sensors within a second preset time limit, the control module allows the mouse to enter a standby mode.

For example, the control module sends a message of prompting for rest, in a case where, within a third preset time limit, intervals during which all the pressure sensors do not detect a finger pressure are less than a fourth preset time limit.

At least embodiment of the present disclosure provides a computer system, comprising a computing device and the mouse, wherein the computing device is in signal connection with the mouse and configured to operate according to instructions of the mouse.

At least embodiment of the present disclosure provides a permission control method, comprising: acquiring fingerprints of fingers; determining whether the fingerprints that are acquired in consistence with default fingerprints respectively; and enabling a corresponding operation permission according to a number of fingerprint or fingerprints in consistence with the default fingerprints.

For example, enabling of the corresponding operation permission according to the number of fingerprint or fingerprints in consistence with the default fingerprints comprises: in a case where only one fingerprint is in consistence with one of the default fingerprints, enabling the corresponding operation permission according to the permission level corresponding to a fingerprint module which acquires the one fingerprint, in which different fingerprint modules correspond to different permission levels; and in a case where at least two fingerprints are in consistence with the default fingerprints, enabling the corresponding operation permission according to the number of fingerprints in consistence with the default fingerprints.

For example, enabling of the corresponding operation permission according to the number of fingerprints in consistence with the default fingerprints comprises: calculating a sum of the number of fingerprints in consistence with the default fingerprints in the fingerprint modules, and enabling the corresponding operation permission, in which the number of fingerprint in consistence with the default fingerprints in each fingerprint module is zero or one.

For example, in a case where one acquired fingerprint is in consistence with one of the default fingerprints, the control module entirely or partially enables a touch function of a touch sensor of the fingerprint module which acquires the one fingerprint.

For example, the control module generates and outputs a corresponding operation instruction according to a touch signal sensed by the touch sensor upon the touch function of the touch sensor being enabled.

For example, the method further comprises: generating an alarm instruction and/or an alarm message in a case where no acquired fingerprint is in consistence with the default fingerprints within a first time limit or a default recognition attempt limit.

BRIEF DESCRIPTION OF THE DRAWINGS

The characteristics and the advantages of the present disclosure could be more clearly understood with reference to the accompanying drawings. The accompanying drawings are illustrative and shall not be construed as the limitation of the present disclosure. In the accompanying drawings.

DETAILED DESCRIPTION

For more clear understanding of the objectives, the characteristics and the advantages of the present disclosure, more detailed description will be given below to the present disclosure with reference to the accompanying drawings and the preferred embodiments. It should be noted that the embodiments of the application and the characteristics in the embodiments may be mutually combined without conflict.

Many specific details will be given in the following description for good understanding of the present disclosure. However, the present disclosure may also adopt other embodiments different from those described here. Therefore, the scope of protection of the present disclosure shall not be defined by the preferred embodiments disclosed below.

Figure 1:
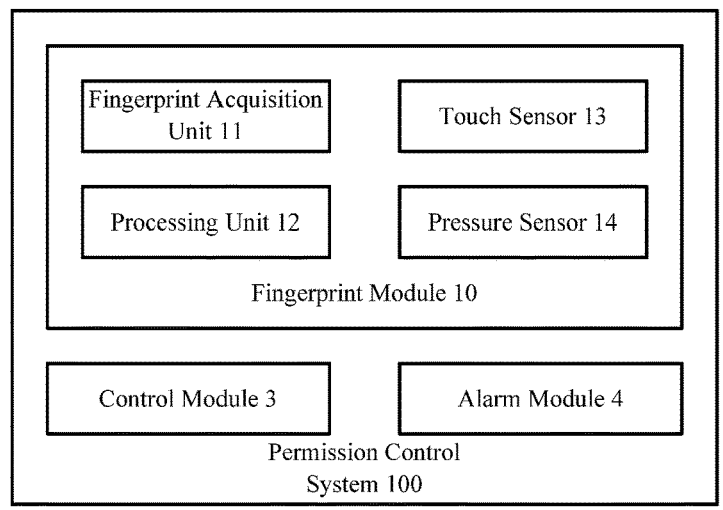
FIG. 1 is a schematic block diagram of a permission control system provided by an embodiment of the present disclosure.

As illustrated in FIG. 1, a permission control system 100 provided by an embodiment of the present disclosure comprises fingerprint modules 10. The fingerprint modules 10 can acquire one or more fingerprints, and correspondingly operation permission can be controlled on the basis of the acquired fingerprint(s).

An embodiment of the present disclosure, for instance, comprises at least two fingerprint modules or more than two fingerprint modules 10. Each fingerprint module 10 includes: a fingerprint acquisition unit 11 configured to acquire the fingerprint of a finger, in which the fingerprint acquisition unit 11, for instance, may be an image pick-up device or sensor configured to acquire a fingerprint image; and a processing unit 12 configured to determine whether the fingerprint that is acquired is in consistence with default fingerprints, in which the processing unit 12, for instance, may be a microprocessor chip or a programmable logic circuit (PLC). The permission control system 100 may further include: a control module 20 configured to enable an appropriate operation permission according to the number of fingerprint(s) in consistence with the default fingerprint(s). The processing unit 12 and the control module 20, for instance, may be microprocessor chips or PLCs, and may also be realized by means of software, hardware or firmware.

The permission control system provided by an embodiment can verify the fingerprint(s) of one or more fingers, and enable corresponding operation permission according to the number of the verified fingerprint(s). For instance, in the case where the processing unit determines that only one fingerprint in the acquired fingerprints is in consistence with one of the default fingerprints, the operation permission of network connection in the computer may be enabled; in the case where the processing unit determines that two fingerprints in the acquired fingerprints are in consistence with the default fingerprints, the file browsing permission in the computer may be enabled; in the case where the processing unit determines that three fingerprints in the acquired fingerprints are in consistence with the default fingerprints, the operation permission of application or software installation in the computer may be enabled; and in the case where the processing unit determines that four fingerprints in the acquired fingerprints are in consistence with the default fingerprints, the permission of playing games via the computer may be enabled.

For instance, parents may enter their four fingerprints and two fingerprints of children into a database in advance as the default fingerprints. In the process of entering the fingerprints in advance, the at least two fingerprint modules may be started simultaneously and may also be started sequentially by order of priority, as long as it can be guaranteed that the number of fingerprints entered for low permission is less than the number of fingerprints entered for high permission. Thus, when the parents employ the permission control system provided by the embodiment, at most four fingerprints can be in consistence with the default fingerprints, so the highest permission of the computer (supposing that the permission of playing games via the computer belongs to the highest permission of the computer) can be enabled at most for the full management and control of the computer. When the children employ the permission control system provided by the embodiment, at most two fingerprints can be in consistence with the default fingerprints, so the file browsing permission of the computer can be enabled at most.

Therefore, different operation permissions can be enabled according to the number of the verified fingerprint(s) on the basis of different numbers of fingerprints entered in advance by different people. The permission level may be increased according to the number of fingerprint(s) in consistence with the default fingerprints from less to more, and different permissions may also be set as required.

When the permission control system provided by the embodiment is adopted for permission control, the traditional mode of enabling corresponding permission by ID authentication can be avoided. Because there is only one user ID, but the number of fingers is plural and each finger corresponds to a different fingerprint, each user can flexibly use one or more fingerprints for authentication, so that different numbers of fingerprints can be verified to enable different permissions. Compared with the mode of enabling a corresponding permission by ID authentication only, the embodiment can flexibly enable a plurality of different operation permissions and hence can improve the flexibility and the convenience of permission control.

Of course, the embodiment may further verify the user ID according to the acquired fingerprints.

According to an embodiment of the present disclosure, different fingerprint modules 10 may correspond to different permission levels.

For instance, when only one fingerprint is in consistence with one of the default fingerprints, the control module 20 enables a corresponding operation permission according to the permission level corresponding to the fingerprint module 10 which acquires the one fingerprint.

When at least two fingerprints are in consistence with the default fingerprints, the control module 20 enables a corresponding operation permission according to the number of fingerprints in consistence with the default fingerprints.

In the embodiment, in the case that only one fingerprint is in consistence with one of the default fingerprints, a corresponding operation permission may also be enabled according to the permission level corresponding to the fingerprint module which acquires the one fingerprint, so that the operability of permission control can be further improved.

For instance, four fingerprint modules are provided, in which the permission level of a first fingerprint module 101 is the permission of playing games via the computer; the permission level of a second fingerprint module 102 is the operation permission of application installation in the computer; the permission of a third fingerprint module 103 is file browsing permission; and the permission of a fourth fingerprint module 104 is the operation permission of network connection. Thus, when only the fingerprint acquired by the second fingerprint module 102 among the four fingerprint modules is verified (for instance, the user presses the finger on the second fingerprint module 102 only), the operation permission of application installation in the computer can be enabled according to the permission level of the second fingerprint module 102.

For instance, the control module 20 is configured to calculate the sum of the number of fingerprints in consistence with the default fingerprints in the fingerprint modules 10, and enable the corresponding operation permission, in which the number of fingerprint in consistence with the default fingerprints in each fingerprint module 10 is zero (0) or one (1).

If each fingerprint acquisition unit can acquire the fingerprint of a finger, there may be the case that fingerprints are repeatedly entered into one fingerprint acquisition unit, so that the number of fingerprints in consistence with the default fingerprints can be accumulated up to a certain value, and hence higher permission may be enabled; however this case does not accurately reflect the intended permission.

In an embodiment, as the number of fingerprint in consistence with the default fingerprints in each fingerprint module is 0 or 1, the fingerprint of each fingerprint module has two cases: one case is that the acquired fingerprint is not consistent with the default fingerprint, so the number of fingerprint in consistence with the default fingerprints in the fingerprint module is 0; and the other case is that the acquired fingerprint is consistent with the default fingerprint, so the number of fingerprint in consistence with the default fingerprints in the fingerprint module is 1. The number of the verified fingerprints in all the fingerprint modules may be obtained by further calculating the sum of the number of fingerprints in consistence with the default fingerprints in fingerprint modules. Thus, permission misjudgment, caused by the accumulation of the number of the verified fingerprints by repeated entry of fingerprints in one fingerprint module, can be avoided.

Moreover, the effective time period of acquiring the fingerprint of fingers by the fingerprint modules may further be set. When a fingerprint acquisition unit of one fingerprint module has acquired the fingerprint of a finger, the processing units of other fingerprint modules only determine whether the fingerprint of a finger acquired within a certain time period (e.g., 2 seconds, which is close to the time of one touch by a human hand) is in consistence with the default fingerprint or not. Thus, the permission control system only determines the fingerprints acquired within the time period of one touch operation, which can further avoid the case of permission misjudgment caused by the accumulation of the number of the verified fingerprints by repeated entry of fingerprint in one fingerprint module.

According to one example of the present disclosure, each of the fingerprint modules 10 further includes a touch sensor 13.

When the fingerprints recognized by a fingerprint module 10 is in consistence with the default fingerprints, the control module 20 entirely or partially enables the touch function of the touch sensor 13 of the fingerprint module 10.

According to one example of the present disclosure, the control module 20 generates and outputs a corresponding operation instruction according to a touch signal sensed by the touch sensor 13 when the touch function of the touch sensor 13 is enabled.

In an embodiment, the functions of the touch sensor and the recognition unit may be independent of each other. For instance, all the touch sensors may be enabled, or part of the touch sensors may be enabled, after the successful verification of one fingerprint.

Each sensor may sense such an operation as slide of a finger or long press of the finger, and different sensors can execute different controls according to the sensed operations. For instance, a touch sensor corresponding to the thumb can adjust sound volume when sensing the slide operation of the thumb, and may turn on a video player when sensing the long press of the thumb. A touch sensor corresponding to the forefinger may control the sliding of a web page when sensing the slide operation of the forefinger, and may open chart software when sensing the long press of the forefinger, so that the user can quickly switch display interfaces and can complete more operations that can be conducted via a mouse.

By provision of the touch sensors, the user can realize more functions that can be conducted via a mouse.

According to one example of the present disclosure, the fingerprint module 10 may also include an alarm module 30. When no acquired fingerprint is in consistence with the default fingerprints within a first time limit or a default recognition attempt limit (limited times), the alarm module generates an alarm instruction and/or an alarm message. The alarm module 30, for instance, is a signal light or a speaker.

When no acquired fingerprint is in consistence with the default fingerprints within the first time limit or the default recognition attempt limit, it is indicated that the user has tried for a period of time or for a plurality of times but verification is not passed through, so the alarm module can determine the current user to be an unauthorized user and hence send an alarm message to alarm a valid user so as to avoid privacy disclosure.

Figure 2:
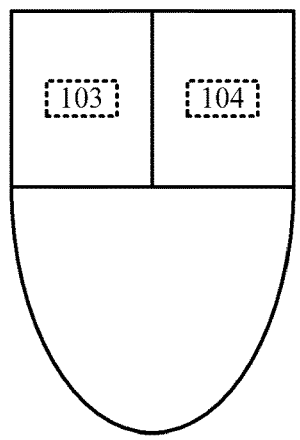
FIG. 2 is a top view of a mouse provided by an embodiment of the present disclosure.
Figure 3:
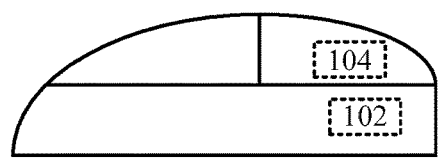
FIG. 3 is a right view of the mouse provided by an embodiment of the present disclosure.
Figure 4:
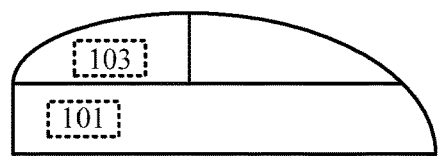
FIG. 4 is a left view of the mouse provided by an embodiment of the present disclosure.

According to an embodiment of the present disclosure, as illustrated in FIGS. 2 to 4, the present disclosure further provides a mouse, which comprises the foregoing permission control system 100, and further comprises: a mouse body, in which the mouse body includes a left side, a right side, a left button area and a right button area. For instance, each fingerprint module also includes an input area correspondingly. The input area is disposed on at least one of the left side, the right side, the left button area or the right button area.

According to an example of the present disclosure, the number of the fingerprint modules is four, and correspondingly four input areas are respectively disposed on the left side, the right side, the left button area and the right button area of the mouse body.

For instance, the input area of the first fingerprint module 101 is disposed on the left side of the first half of the mouse body; the input area of the second fingerprint module 102 is disposed on the right side of the first half of the mouse body; the input area of the third fingerprint module 103 is disposed at the left button position; and the input area of the fourth fingerprint module 104 is disposed at the right button position.

When a user holds the mouse, four fingers, namely the thumb, the forefinger, the middle finger and the ring finger, generally respectively make contact with the left side of the first half, the left button, the right button, and the right side of the first half of the mouse body. The four fingerprint modules arranged in accordance with an embodiment are more ergonomic. Thus, in using the mouse, the user can automatically make the fingers contact corresponding fingerprint modules for verification, and hence the operations of the user can be smoother.

An embodiment effectively utilizes the areas at which the fingers of the user contact the mouse, not only can enrich the functions of the mouse, but also can improve privacy protection and simplify verification.

According to an example of the present disclosure, the fingerprint module 10 may also include a pressure sensor 14 configured to detect pressure. When no pressure is detected by all the pressure sensors 14 within a second preset time limit, the control module 20 allows the mouse to enter a standby mode.

When no pressure is detected by all the pressure sensors within the second preset time limit, it is indicated that the user has not been operating the mouse for a period of time, so the mouse may be controlled to enter a standby mode, so as to save electricity.

According to an example of the present disclosure, if the intervals during which the pressure sensors 14 do not detect a finger pressure within a third preset time limit are all less than a fourth preset time limit, the control module 20 sends a message of prompting for rest.

For instance, if the intervals during which the pressure sensors do not detect a finger pressure are all less than 5 minutes within 100 minutes, it is indicated that the user has been operating the mouse within the 100 minutes, so the control module can send a message of prompting for rest, which can prevent the user from being too tired and protect eyesight and can also effectively prevent the diseases such as "carpal tunnel syndrome (CTS)" and cervical spondylosis caused by the long-term mouse operation.

An embodiment of the present disclosure further provides a computer system, which comprises a computing device and the mouse 1. The computing device is in signal connection with the mouse and operates according to instructions of the mouse. The specific structures and the functions of the mouse can be referred to the above embodiments. No further description will be given here. The computing device, for instance, may be a personal computer (PC) body, a portable computer, a personal digital assistant (PDA), etc.

Figure 5:
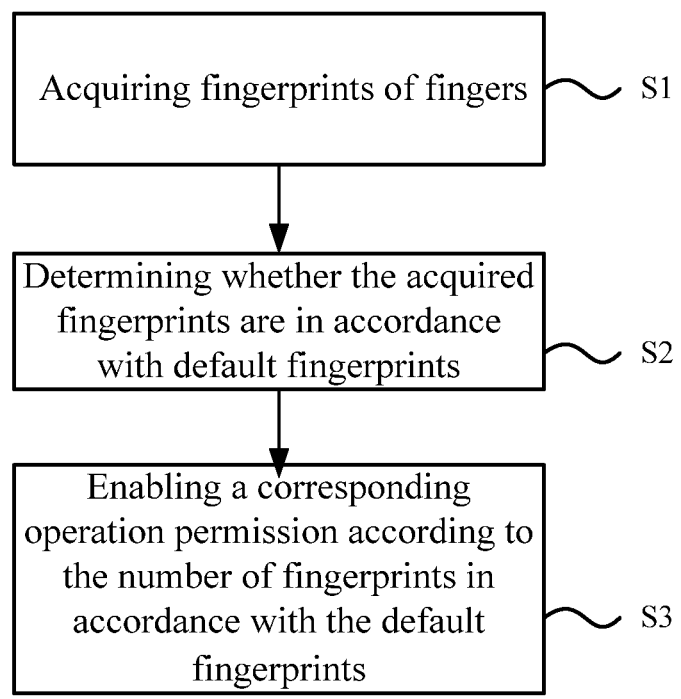
FIG. 5 is a flow diagram of a permission control method provided by an embodiment of the present disclosure.

As illustrated in FIG. 5, an embodiment of the present disclosure further provides a permission control method. The method corresponds to the foregoing permission control system. Only simple description will be given below for the sake of simplicity of the description. The method may comprise the following operations:

S1: acquiring fingerprints of fingers;

S2: determining whether the fingerprints that are acquired in consistence with default fingerprints respectively; and S3: enabling a corresponding operation permission according to the number of fingerprint or fingerprints in consistence with the default fingerprints.

According to an example of the present disclosure, the step of enabling a corresponding operation permission according to the number of fingerprint or fingerprints in consistence with the default fingerprints may include the following operations:

S31: in the case where only one fingerprint is in consistence with one of default fingerprints, enabling a corresponding operation permission according to a permission level corresponding to a fingerprint module which acquires the one fingerprint, in which different fingerprint modules correspond to different permission levels; and S32: in the case where at least two fingerprints are in consistence with default fingerprints, enabling a corresponding operation permission according to the number of fingerprints in consistence with the default fingerprints.

According to an example of the present disclosure, the operation of enabling a corresponding operation permission according to the number of fingerprints in consistence with the default fingerprints includes: calculating the sum of the number of fingerprints in consistence with the default fingerprints in fingerprint modules, and enabling a corresponding operation permission, in which the number of fingerprints in consistence with the default fingerprints in each fingerprint module is zero or one.

According to an example of the present disclosure, when an acquired fingerprint is in consistence with the default fingerprints, the control module entirely or partially enables the touch function of the touch sensor of the fingerprint module which recognizes the fingerprint.

According to an example of the present disclosure, when the touch function of the touch sensor is enabled, the control module generates and outputs a corresponding operation instruction according to a touch signal sensed by the touch sensor.

According to an example of the present disclosure, the method may further comprise the following operation: generating an alarm instruction and/or an alarm message when no acquired fingerprint is in consistence with the default fingerprints within a first time limit or a default recognition attempt limit.

Detailed description has been given above to the technical proposals of the present disclosure with reference to the accompanying drawings. In the state of art, the operation of verifying a user ID via a computer is cumbersome and has low safety. As there is only one user ID, but the number of fingers is numerous and each finger corresponds to a different fingerprint, by adoption of the above technical proposal, each user may flexibly use one or more fingerprints for verification, so that different numbers of fingerprints can be verified as required to enable different permissions. Compared with the mode of enabling corresponding permission by ID authentication in the state of art, the embodiments can flexibly enable a plurality of different operation permissions and hence can improve the diversity and the convenience of permission control.

In the present disclosure, the terms "first", "second", "third" and "fourth" are only used for description and shall not be construed as the indication or implication of relative importance. Unless otherwise specified, the term "a plurality of . . . " refers to two or more than two.

The foregoing is only the preferred embodiments of the present disclosure and not intended to limit the present disclosure. Various modifications and variations may be made to the present disclosure by those skilled in the art. Any modification, equivalent replacement, improvement or the like made within the spirit and the principle of the present disclosure shall fall within the scope of protection of the present disclosure.

The application claims priority to the Chinese patent application No. 201510696425.5, filed Oct. 23, 2015, the entire disclosure of which is incorporated herein by reference as part of the present application.

What is claimed is:

1. A permission control system, comprising:
   fingerprint modules, wherein each of the fingerprint modules comprises:
   a fingerprint acquisition unit configured to acquire a fingerprint of a finger; and
   a processor configured to determine whether the fingerprint acquired by the fingerprint acquisition unit is in consistence with default fingerprints, wherein a count of fingerprints in consistence with the default fingerprints in each of the fingerprint modules is zero or one; and
   a controller configured to enable an operation permission of a corresponding permission level according to a total count of fingerprint modules which have fingerprints in consistence with the default fingerprints, wherein a greater total count corresponds to a higher permission level.

2. The system according to claim 1, wherein different fingerprint modules correspond to different permission levels.

3. The system according to claim 2, wherein in a case where only one fingerprint is in consistence with the default fingerprints, the controller is configured to enable the operation permission according to a permission level corresponding to a fingerprint module which acquired the one fingerprint; and
   in a case where at least two fingerprints are in consistence with the default fingerprints, the controller is configured to enable the operation permission according to the total count.

4. The system according to claim 1, wherein each of the fingerprint modules is configured to acquire one fingerprint at a time.

5. The system according to claim 1, wherein each of the fingerprint modules further comprises: a touch sensor,
   wherein in a case where a fingerprint recognized by a fingerprint module is in consistence with the default fingerprints, the controller is configured to entirely or partially enable a touch function of the touch sensor of the fingerprint module.

6. The system according to claim 5, wherein the controller is configured to generate and output a corresponding operation instruction according to a touch signal sensed by the touch sensor upon the touch function of the touch sensor being enabled.

7. The system according to claim 1, further comprising:
   an alarm configured to generate an alarm instruction and/or an alarm message in a case where no acquired fingerprint is in consistence with the default fingerprints within a first time limit or a default recognition attempt limit.

8. The system according to claim 3, wherein each of the fingerprint modules further comprises: a touch sensor,
   wherein in a case where a fingerprint recognized by a fingerprint module is in consistence with the default fingerprints, the controller is configured to entirely or partially enable a touch function of the touch sensor of the fingerprint module.

9. A mouse, comprising:
   a permission control system comprising:
   four fingerprint modules, wherein each of the four fingerprint modules comprises:
   a fingerprint acquisition unit configured to acquire a fingerprint of a finger; and
   a processor configured to determine whether the fingerprint acquired by the fingerprint acquisition unit is in consistence with default fingerprints, wherein a count of fingerprints in consistence with the default fingerprints in each of the four fingerprint modules is zero or one; and
   a controller configured to enable an operation permission of a corresponding permission level according to a total count of fingerprint modules which have fingerprints in consistence with the default fingerprints, wherein a greater total count corresponds to a higher permission level; and
   a mouse body comprising a left side, a right side, a left button area, and a right button area, wherein each of the four fingerprint modules comprises an input area correspondingly; and four input areas of the four fingerprint modules are respectively disposed on the left side, the right side, the left button area, and the right button area.

10. The mouse according to claim 9, wherein each of the fingerprint modules is configured to acquire one fingerprint at a time.

11. The mouse according to claim 9, wherein each of the fingerprint modules further comprises:
    a pressure sensor configured to detect pressure; and in a case where no pressure is detected by all pressure sensors within a second preset time limit, the controller is configured to allow the mouse to enter a standby mode.

12. The mouse according to claim 11, wherein the controller is configured to send a message of prompting for rest in a case where, within a third preset time limit, intervals during which all of the pressure sensors do not detect a finger pressure are less than a fourth preset time limit.

13. A computer system, comprising a computing device and the mouse according to claim 9, wherein the computing device is in signal connection with the mouse and configured to operate according to instructions of the mouse.

14. A permission control method, comprising:
    acquiring a fingerprint of a finger through each fingerprint module of a plurality of fingerprint modules;
    determining whether the fingerprint acquired by each fingerprint module is in consistence with default fingerprints, wherein a count of fingerprints in consistence with the default fingerprints in each fingerprint module is zero or one; and
    enabling an operation permission of a corresponding permission level according to a total count of fingerprint modules which have fingerprints in consistence with the default fingerprints, wherein a greater total count corresponds to a higher permission level.

15. The method according to claim 14, wherein the enabling the operation permission of the corresponding permission level according to the total count of fingerprint modules which have fingerprints in consistence with the default fingerprints comprises:

in a case where only one fingerprint module has a fingerprint in consistence with the default fingerprints, enabling the operation permission according to a permission level corresponding to the one fingerprint module, in which different fingerprint modules correspond to different permission levels; and in a case where at least two fingerprint modules have fingerprints in consistence with the default fingerprints, enabling the operation permission according to the total count.

16. The method according to claim 14, wherein each fingerprint module is configured to acquire one fingerprint at a time.

17. The method according to claim 14, wherein in a case where one acquired fingerprint is in consistence with the default fingerprints, a controller entirely or partially enables a touch function of a touch sensor of a fingerprint module which acquired the one fingerprint.

18. The method according to claim 17, wherein the controller generates and outputs a corresponding operation instruction according to a touch signal sensed by the touch sensor upon the touch function of the touch sensor being enabled.

19. The method according to claim 14, further comprising:

generating an alarm instruction and/or an alarm message in a case where no acquired fingerprint is in consistence with the default fingerprints within a first time limit or a default recognition attempt limit.

\* \* \* \* \*